United States Patent [19]

Spisak

[11] 4,220,373

[45] Sep. 2, 1980

[54] WHEEL TRIM AND RETAINER ASSEMBLY

[76] Inventor: Edward G. Spisak, 35700 Oakwood La., Westland, Mich. 48185

[21] Appl. No.: 35,485

[22] Filed: May 3, 1979

[51] Int. Cl.² .............................................. B60B 7/04
[52] U.S. Cl. ................................. 301/37 P; 301/37 R
[58] Field of Search ................. 301/37 R, 37 P, 37 T, 301/37 TC, 37 B, 37 TP, 37 PB

[56] References Cited

U.S. PATENT DOCUMENTS

| | | | |
|---|---|---|---|
| 2,544,699 | 3/1951 | Lyon | 301/37 B |
| 3,416,840 | 12/1968 | Gibbings | 301/37 P |
| 4,131,322 | 12/1978 | Beisch et al. | 301/37 R X |

Primary Examiner—Charles A. Marmor
Attorney, Agent, or Firm—Fisher, Gerhardt, Crampton & Groh

[57] ABSTRACT

A wheel trim assembly including a retainer for mounting on a vehicle wheel wherein a cover member has a peripheral flange and an annular retaining ring is provided with wheel engaging retaining elements and is disposed at one side of the cover member in engagement with an axially extending annular flange formed on the inboard side of the cover member so that the retainer ring is held centered relative to the cover member. A clamping ring engages and holds the retaining ring assembled to the cover member.

9 Claims, 5 Drawing Figures

WHEEL TRIM AND RETAINER ASSEMBLY

This invention relates to decorative trim assemblies for automotive vehicle wheels and more particularly to trim assemblies including both metal and plastic components.

The difficulties and problems of maintaining wheel trim or wheel covers on a vehicle wheel are compounded when the wheel trim is made primarily of plastic material. Typically resilient metal retainers are required to form a good mounting arrangement but problems are created in attaching metal retaining members to the plastic portion of the wheel trim.

It is an object of the invention to provide a wheel trim assembly and particularly an improved retainer arrangement for plastic wheel trim.

Another object of the invention is to provide a trim assembly having a plastic decorative cover portion including a metal retaining assembly which does not require fasteners to form a permanent assembly.

The objects of the invention are accomplished by providing a wheel trim assembly having a disc-shaped cover member made of plastic material with an annular axially extending rib formed integrally on the inboard side of a radially extending peripheral flange. An annular retaining ring is disposed on the inboard side of the cover member and has a plurality of alternative radially and axially extending flanges with a plurality of retaining elements mounted on one of the axially extending flanges to grip a vehicle wheel to hold the entire wheel trim assembly in position. Another of the axially extending flanges is disposed on the radial outer surface of the rib to maintain the cover and retaining ring concentric with each other. One of the radially extending flanges of the retaining ring engages an outboard surface of the wheel to limit axial inward movement of the trim assembly relative to the wheel. The cover member and retaining ring are held in permanently assembled and properly located relationship to each other by a decorative metal clamping ring forming the periphery of the trim assembly.

These and other objects of the invention will be apparent from the following description and from the drawings in which.

Figure 1:
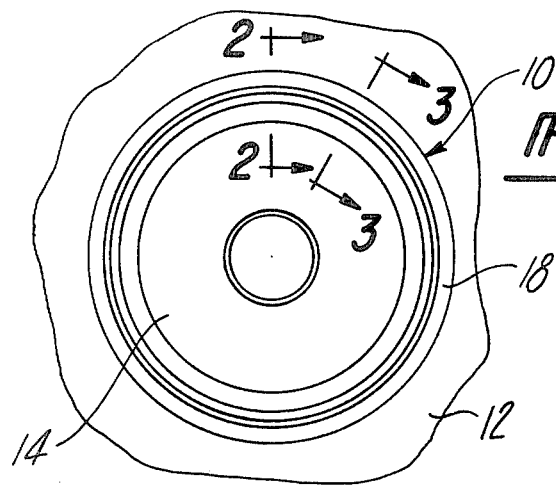
FIG. 1 is a front elevation of a wheel cover embodyin features of the present invention.

A decorative wheel trim assembly is designated generally at 10 and is mounted on a vehicle wheel 12. The wheel trim assembly 10 includes a decorative cover member 14 made of plastic material and a metal retention subassembly or retainer ring 16 held in position on the cover 14 by a clamping ring 18.

The cover member 14 may be injection molded of plastic materials of a variety of types to form a relatively rigid body member. The outboard surface can take a variety of decorative shapes and configurations. The outer periphery of the cover member 14 has a radially extending flange 22 with a flat outboard surface 24 and flat inboard surface 26. The inboard surface 26 is provided with an annular axially extending rib 28 which serves to locate retainer ring 16.

Figure 4:
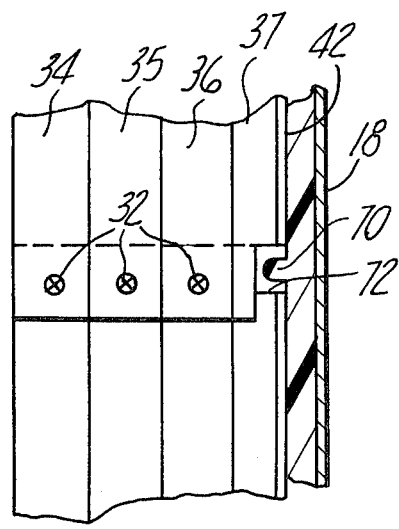
FIG. 4 is a fragmentary sectional view taken on line 4—4 in FIG. 3.

The retainer ring 16 includes a stepped annular ring 16 which is made of a strip of metal cut to a length corresponding generally to the circumference of the cover member 14 and shaped to circular form with the ends of the strip overlapped and fastened together as by spot welding indicated at 32 in FIG. 4.

Figure 2:
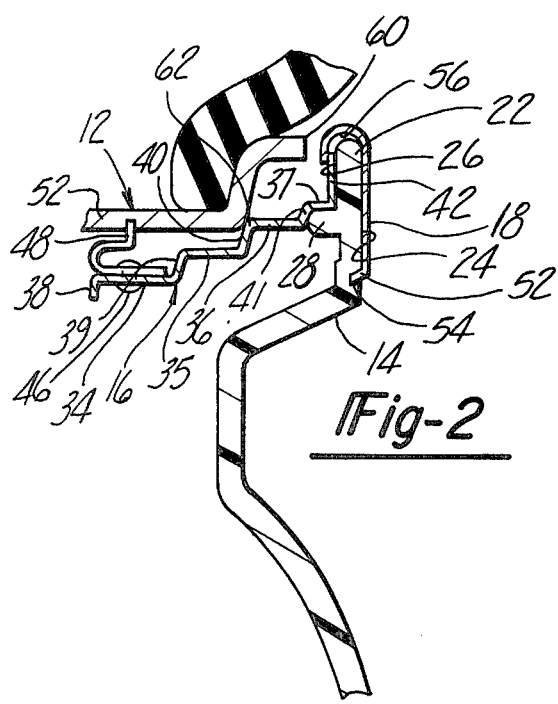
FIG. 2 is a fragmentary cross-section, at enlarged scale taken on line 2—2 in FIG. 1.
Figure 5:
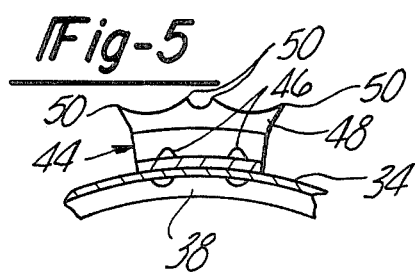
FIG. 5 is a view of a portion of the structure seen in FIG. 2 as viewed from the right in that figure.

The retaining ring 16 has a plurality of axially extending flanges 34, 35, 36 and 37 alternating with radially extending flanges 38, 39, 40, 41 and 42. As seen in FIG. 2 and FIG. 5 the axial flange 34 supports a plurality of retaining elements 44, only one of which is shown but which are arranged in uniformly spaced relationship. At least three such retaining elements 44 are used although a larger number may be used. The retaining elements 44 can be fastened to the flange 34 by means of rivets 46 and have a blade portion 48 with teeth 50. When the wheel trim 10 is supported on a wheel 12, the teeth 50 engage an axially extending wheel flange 52 as seen in FIG. 2.

The position of the retainer ring 16 relative to the cover member 14 is established by the flange 22 and the rib 28. In the assembled position, the radially extending flange 42 of the retaining ring 16 is in abutting relationship with the inboard surface 26 of the flange 22. Also, the axially extending flange 37 abuts the radial outer surface of the rib 28 and the radially extending flange 41 is in engagement with the inboard end of the rib 28.

The retainer ring 16 is held in position at the inboard side of the cover member 14 by means of the clamping ring 18. The clamping ring 18 has a radially inner lip 52 which is disposed in a complementary slot 54. The outer peripheral edge of the clamping ring 18 has a radially inwardly opening trough or channel 56 which receives the flange 22 of the cover member 14 and the radially extending flange 42 of the retainer ring 16. During manufacture the retainer ring 16 is positioned relative to the cover 14 and the clamping ring 18 is deformed in a metal working operation to form the trough 56 to engage the inboard surface of flange 42 and outboard surface 24 of cover flange 22 and serves to permanently secure the cover 14, the retainer ring 16 and the clamping ring 18 in an assembled relationship. The clamping ring 18 preferably is made of a decorative metal such as stainless steel whereas the retainer ring 16 does not require a decorative finish and can be made of a less costly metal.

When the wheel trim assembly 10 is mounted on the wheel 12 it will be noted that the peripheral outer portions formed by the flange 22 and the clamping ring 18 are disposed coextensively with the outer lip 60 of the wheel 12. Upon attachment of the wheel trim 10 to the wheel 12, the wheel trim 10 is aligned axially with the wheel 12 and upon relative axial movement, the blades 48 on the retaining elements 44 engage the axially extending flange 52 of the wheel and are deflected so that the teeth 50 resists axial outward movement of the wheel trim 10 relative to the wheel 12. In the attached position as seen in FIG. 2, the axially extending flange 36 and the adjoining radially extending flange 40 form a step indicated at 62 which engages the outboard edge of the axially extending wheel flange 52 to limit inward movement of the wheel trim assembly 10 relative to the wheel 12.

Removal of the wheel trim 10 from the wheel 12 is accomplished by insertion of a tool in the gap formed between the lip 60 of the wheel 12 and the outer peripheral portion of the wheel trim assembly 10. Prying action at selected circumferencial areas serves to deflect the retaining elements 44 and permit removal of the wheel trim assembly 10.

Figure 3:
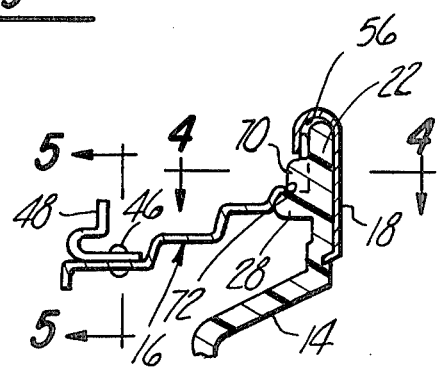
FIG. 3 is a cross-sectional view, also at enlarged scale taken on line 3—3 in FIG. 1.

Referring now to FIG. 3 the retainer ring 16 is positioned relative to the cover member 14 by means of a stop portion 70 which is formed integrally with both the flange 22 and rib 28 in at least one location on the periphery of the cover 14. The stop 70 receives a notch 72 which is formed at the juncture of flanges 37 and 42 of the retainer ring 16 as best seen in FIG. 4. The notch 72 is formed by removing a corner of each end of the metal strip forming the retainer ring 16 so that in the assembled condition the notch has the appearance seen in FIG. 4. In the assembled condition relative rotation of the retention ring 30 and the cover 14 are prevented by interference between the stop 70 and the notch 72.

The wheel trim assembly has been provided for mounting on a vehicle wheel in which a disc-shaped cover member made of plastic material is provided with a metal retaining ring supporting retaining elements which engage axially extending portions of the wheel to hold the wheel trim assembly on the wheel. The annular retaining ring is held relative to the plastic cover member by a clamping ring which not only adds decorative aspects to the wheel trim assembly but serves also to permanently hold the plastic cover member and the metal retainer ring in assembled condition without requiring fasteners.

The embodiments of the invention in which an exclusive property or privilege is claimed are defined as follows:

1. A wheel trim assembly for mounting on a vehicle wheel comprising; a cover member having a radially extending peripheral flange, an annular retaining ring disposed at one side of said cover member, a plurality of retaining elements uniformly spaced on said retaining ring and adapted to engage said wheel to maintain said trim assembly on said wheel, an annular axially extending rib radially inset from the outer edge of said peripheral flange and formed on the inboard side of said cover member, said retaining ring having an axially extending flange seated on the radial outer surface of said rib to maintain said retaining ring coaxially to said cover member, said retaining ring having a radially extending flange abutting with the inboard side of said peripheral flange, a clamping ring engaging the inboard surface of said retaining ring flange and the outboard side of said peripheral flange to maintain said flanges in abutting relationship to each other.

2. The combination of claim 1 wherein a stop element is formed on the inboard side of said peripheral flange and wherein a complementary notch is formed at one edge of said retaining ring to receive said stop element and limit relative rotational movement of said cover and said retaining ring.

3. The combination of claim 1 wherein said retaining ring has a radially extending shoulder intermediate inner and outer edges of said retaining ring engageable with said vehicle wheel to limit axial inward displacement of said wheeled trim assembly relative to said wheel.

4. The combination of claim 1 wherein said clamping ring has an outer portion forming a radially inwardly opening trough engaging said radially extending flange of said retaining ring and said radially extending peripheral flange of said cover member to maintain said flanges in abutting relationship with each other.

5. The combination of claim 4 wherein said clamping ring has an axially inwardly extending edge spaced from said outer portion engageable with a complementary surface on the outboard side of said cover member to limit relative radial displacemnt of said clamping ring and cover member.

6. The combination of claim 1 wherein said retaining ring is made of a strip of material having its opposite ends fastened together.

7. The combination of claim 6 wherein said adjoining ends of said strip of material have corner portions removed to form a notch, said notch being engagable with a projection on the inboard side of said cover member.

8. A wheel trim assembly for mounting on a vehicle wheel of the type having an axially extending flange and a circumferential lip disposed radially outwardly from said axially extending flange, comprising; a disc shaped cover member having a radially extending peripheral flange, an annular axially extending rib formed on the inboard side of said peripheral flange, an annular retaining ring disposed at one side of said cover member and having a plurality of alternate radially extending and axially extending flanges, a plurality of retaining elements uniformly spaced on a first of said axially extending flanges of said retaining ring and adapted to engage said axially extending wheel flange to maintain said trim assembly on said wheel with one of said radially extending flanges extending coextensively with said circumferential lip of said wheel, another of said axially extending flanges of said retaining ring being disposed on the radial outer surface of said rib to maintain said retaining ring coaxially of said cover member, another of said radially extending flanges of said retaining ring being engageable with an outboard surface of said wheel to limit axial inward movement of said cover member relative to said wheel, and a clamping ring engaging the inboard surface of said one of said radially extending flanges and the outboard side of said peripheral flange to maintain said flanges in abutting relationship to each other.

9. A wheel trim assembly set forth in claim 8 wherein a stop element is formed on said peripheral flange and wherein a notch is formed in said one of said radially extending flanges to engage said stop element and limit relative rotational movement of said cover and said retaining ring relative to each other.

* * * * *